United States Patent Office 3,508,936
Patented Apr. 28, 1970

3,508,936
METHOD OF MAKING FLUID SELF-HARDENING MIXTURE, PREFERABLY FOR MANUFACTURING FOUNDRY MOULDS AND CORES
Abram Moiseevich Lyass, Sharikopodshipnikovskaya ulitsa 2, kv. 146; Pavel Afanasievich Borsuk, Nizhne-Pervomaiskaya ulitsa 59, kv. 10; Lidia Dorofeevna Snulova Sharikopodshipnikovskaya ulitsa 2, kv. 125; Anna Ivanovna Tsyruleva, Serpovpereulok 3/5, kv. 8; Elena Vladimirovna Neifak, Nizhne-Pervomaiskaya ulitsa 51/10, kv. 9; and Radzhinald Alexeevich Korotkov, Profsojuznaya ulitsa 32/10, kv. 263, all of Moscow, U.S.S.R.
No Drawing. Filed Sept. 27, 1968, Ser. No. 763,388
Int. Cl. B28b 7/00; C04b 25/06
U.S. Cl. 106—38.35                           2 Claims

ABSTRACT OF THE DISCLOSURE

A method of making a fluid self-hardening mixture, preferably for manufacturing foundry molds and cores, composed of a filler, for example quartz sand, water glass as a binder, an additive in the form of dicalcium silicate or materials containing dicalcium silicate providing for hardening of the mixture, and a foaming agent selected from the group of anionic and non-ionogenic surface active agents, said mixture also comprising abietic resin in the amount of 0.1–0.5 parts by weight.

---

The abietic resin can be introduced into the mixture in the form of an alkaline solution (sodium abietate) of the 10–15% concentration in the amount of 0.1–1.0 parts by weight.

The present invention relates to foundry, practice, and more particularly to methods of making fluid-self hardening mixtures, preferably for manufacturing foundry cores and molds therefrom.

Known in the prior art is a method of making a fluid self-hardening mixture that consists of a filler, for example, quartz sand, a binder, e.g., water glass, components providing for hardening of the mixture, for example, dicalcium silicate, water and a foaming agent, for example, sulphonic acid (the French Patent No. 1,342,529, 1962).

However, although the liquid mixtures thus produced have important technological advantages (free filling of the core boxes with the mixture without compacting it self-hardening of the mixture in the open air, utilization of inexpensive hardeners), they do not ensure reasonably facile knockout of the cores from the castings, especially when the latter have a complex shape.

Furthermore, the proposed mixtures one hour after the hardening have a compression strength of 1.5 to 3 kg./cm.² and this is often not sufficient when storing, transporting and assembling the cores. When making complex-shape cores with projections, the latter are often cut down from the cores during the assembly.

It will also be noted that the mixtures prepared by the known method have a long hardening time (40 to 50 minutes), thus considerably increasing the duration of the casting process. This means that these mixtures are unsuitable for mass production of molds and cores.

An object of the present invention is to eliminate the above-mentioned disadvantages. Further objects of the invention will become apparent from a consideration of the following description thereof.

The specific object of the invention is to develop a method of making a fluid self-hardening mixture providing for a high compression strength of the mixture in the solid state, a short hardening time and easy knocking of the cores from the castings.

This object is achieved by providing a method of making fluid self-hardening mixture, preferably, for producing foundry molds and cores therefrom, composed of a filler, e.g., quartz sand, water glass as a binder, an additive for hardening the mixture which consists of dicalcium silicate or materials comprising dicalcium silicate, a foaming agent selected from the group of anionic and non-ionogenic surface-active agents and water, wherein, according to the invention, abietic resin is also added into the mixture.

The abietic resin is preferably introduced into the mixture in an amount of 0.1 to 0.5 parts by weight. The abietic resin may be introduced into the mixture in the form of an alkaline solution (sodium abietate) of 10–15% concentration in an amount of 0.1–1.0 parts by weight.

The following examples illustrate the invention.

EXAMPLE 1

The mixture is prepared from the following components (in parts by weight).

| | |
|---|---|
| A filler—Quartz sand | 95.0 |
| A binder—Water glass (aqueous solution of sodium silicate) of specific gravity 1.48 and modulus 2.7 | 6.0 |
| An addition for hardening the mixture—dicalcium silicate | 5.0 |
| A foaming agent from the group of anionic substances—alkyl aryl sulphonate (trademark DS—RAS "Detergent Soviet" refined alkyl aryl sulphonate) | 0.1 |
| An additive—Abietic resin | 0.3 |
| Water | 1.5–2.0 |

The dry components such as quartz sand, dicalcium silicate in the form of powdered slag of the ferrochrome production and powdered abietic resin are mixed in a mixing machine for a period of 1 to 2 minutes at 30–40 r.p.m. After that the fluid components such as water glass, a foaming agent of the anionic group in the form of alkyl aryl sulphonate and water are stirred in a separate vessel and fed into the mixing machine, and the mixture is again mixed during 2 to 3 minutes up to the free-flowing (foamy) state.

EXAMPLE 2

The mixture is prepared from the following components (in parts by weight):

| | |
|---|---|
| A filler—Quartz sand | 95.0 |
| A binder—Water glass (aqueous solution of sodium silicate) of specific gravity 1.48 and modulus 2.7 | 6.0 |
| An additive for hardening the mixture—Dicalcium silicate | 5.0 |
| A foaming agent from the group of anionic substances—Alkyl aryl sulphonate (trademark DS-RAS "Detergent Soviet" refined alkyl aryl sulphonate) | 0.1 |
| An additive—Sodium abietate as an alkaline solution of abietic resin of the 10–15% concentration | 0.8 |
| Water | 1.5–2.0 |

The dry components such as quartz sand and powdered ferrochrome slag are mixed in a mixing machine during 1 to 2 minutes at 30–60 r.p.m. Then the fluid components such as a binder—water glass, a foaming agent—sulphonic acid, water and sodium abietate are stirred in a separate vessel and fed into the mixing machine, in which the components are mixed again during 2 to 3 minutes until the mixture changes to a free-flowing (foamy) state.

Due to the introduction of the foaming agents in the amount of a tenth to hundredth fraction of one percent of the weight of the molding mixture, it changes from the pasty to free-flowing state after a few minutes of mixing.

Thereupon, the liquid mixture can be poured into core boxes and on patterns.

The tests have shown that introduction of abietic resin and sodium abietate into the mixture helps to increase its strength by as much as 2–2.5 times (6–8 kg./cm.$^2$ when compressing the specimens during 1 hour) as compared with the strength of the fluid mixture without the above additives. Furthermore, the hardening of the mixture is accelerated by 1.5–2 times (10 to 20 minutes), while the knockout of the cores is facilitated by as much as 20 to 30%.

It has been found, that due to material reduction of the brittleness of the hardened mixture, the break-down of the cores and projecting portions is reduced by as much as 50 percent.

The hardened cores and molds do not require thermal drying and can be filled with molten metal just after their manufacture.

The cores and molds made of the above described mixtures can be employed for manufacturing castings of steel, iron and non-ferrous metal alloys.

It has also been found that when casting non-ferrous alloys addition of abietic resin or sodium abietate into the mixture helps to produce castings with a smooth surface.

In other instances of employing the above method, an aqueous solution of potassium silicate can be used as a binder.

Although the present invention is described in connection with the preferred exemplary embodiments, it will be understood that changes and modifications may be made without departing from the scope of the present invention, as will be readily understood by those skilled in the art.

What is claimed is:

1. In a method of making a fluid self-hardening mixture, for manufacturing foundry molds and cores wherein there are mixed dry components of sand, and dicalcium silicate whereafter there is added to the dry components, a liquid comprising water glass, an anionic foaming agent and water, the liquid and dry components being mixed to form a free-flowing mixture, an improvement comprising adding abietic resin to the mixture of dry components in an amount between 0.1 and 0.5 parts by weight of said mixture.

2. A method as claimed in claim 1 wherein said abietic resin is an alkaline solution of sodium abietate of 10–15% concentration.

References Cited

UNITED STATES PATENTS

| | | | |
|---|---|---|---|
| 1,910,799 | 5/1933 | Kennedy | 106—38.6 |
| 1,978,948 | 10/1934 | Kennedy et al. | 106—38.6 |
| 3,424,600 | 1/1969 | Liass et al. | 106—38.3 |

JULIUS FROME, Primary Examiner.

L. B. HAYES, Assistant Examiner

U.S. Cl. X.R.

106—38.6, 82, 83, 84